Sept. 29, 1959　　　　　F. FISHER　　　　2,906,023
GEOMETRICAL INSTRUMENT AND/OR DRAFTING AID
Filed Aug. 14, 1953　　　　　　　　　3 Sheets-Sheet 1
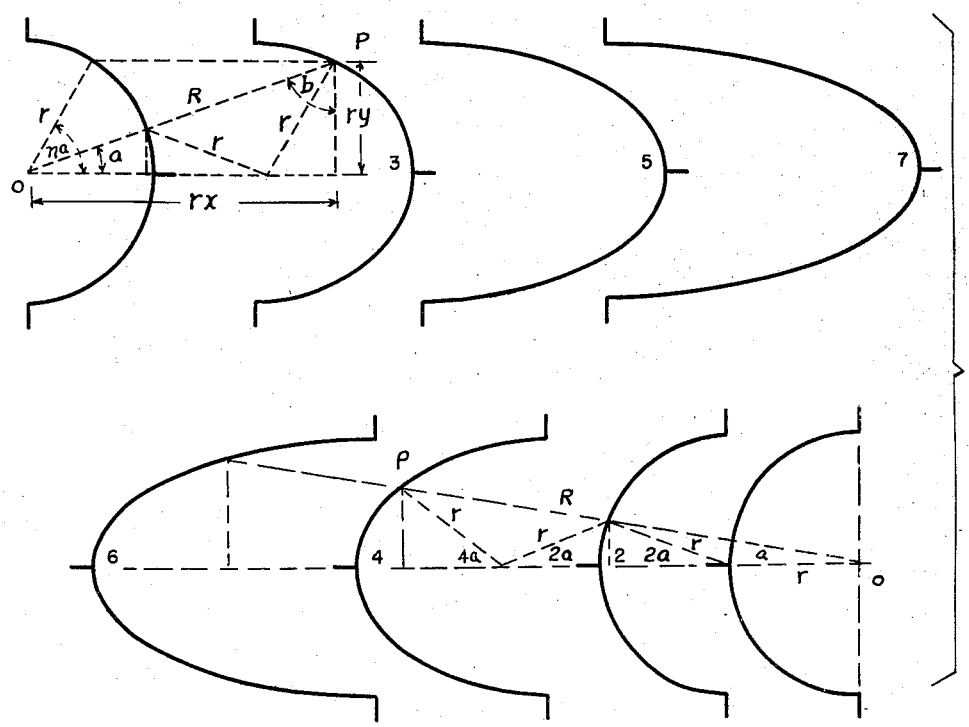
FIG. #1
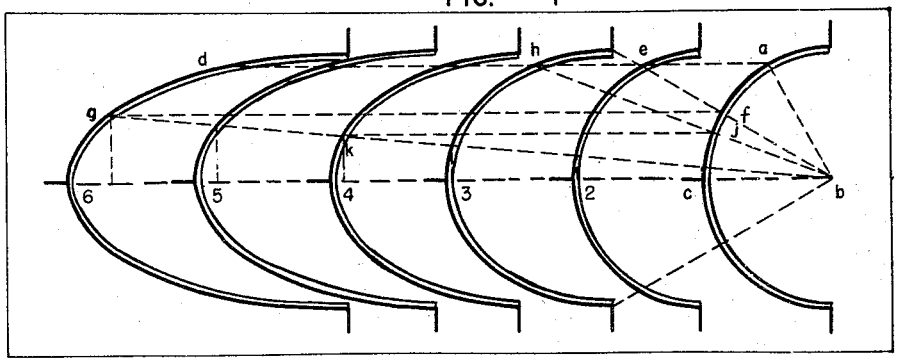
FIG. #2
WITNESS: Franklin D. Bell
INVENTOR: Frank Fisher Sept. 29, 1959  F. FISHER  2,906,023
GEOMETRICAL INSTRUMENT AND/OR DRAFTING AID
Filed Aug. 14, 1953  3 Sheets-Sheet 2
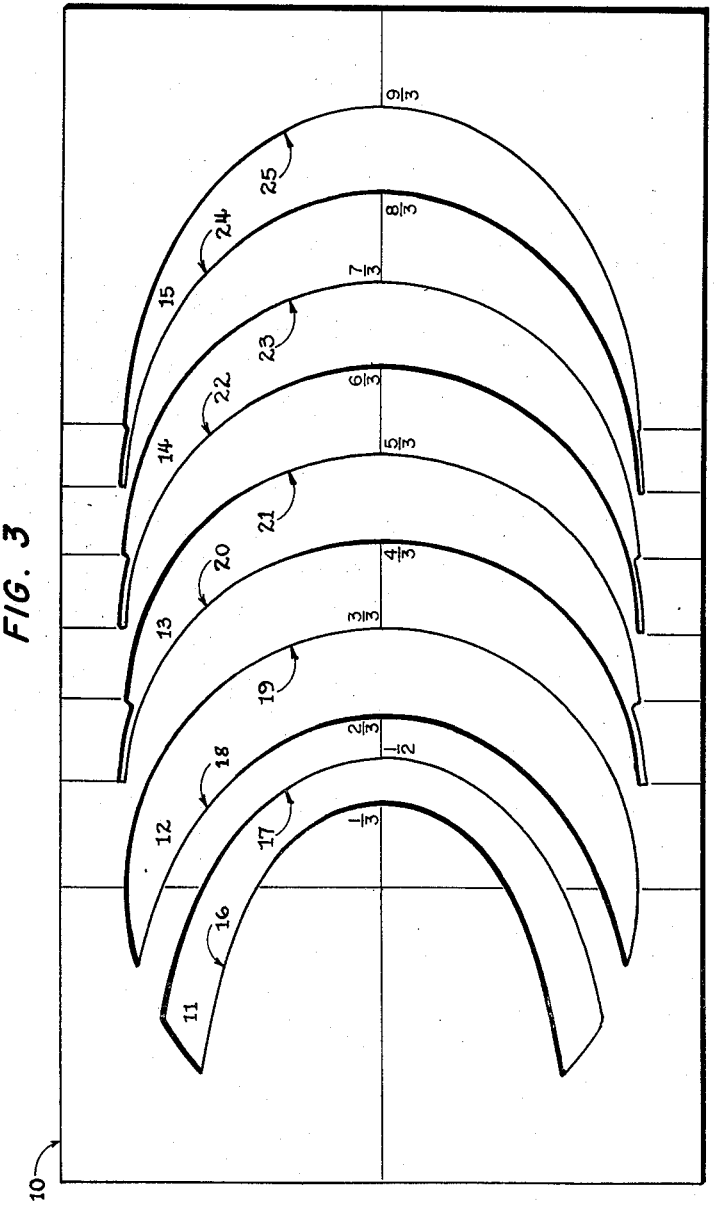
INVENTOR.
FRANK FISHER
BY Howard J. Jeanken
ATTORNEY Sept. 29, 1959         F. FISHER         2,906,023

GEOMETRICAL INSTRUMENT AND/OR DRAFTING AID

Filed Aug. 14, 1953         3 Sheets-Sheet 3

INVENTOR.
FRANK FISHER
BY Howard T. Jennison
ATTORNEY

United States Patent Office 2,906,023
Patented Sept. 29, 1959

2,906,023

GEOMETRICAL INSTRUMENT AND/OR DRAFTING AID

Frank Fisher, New York, N.Y.

Application August 14, 1953, Serial No. 374,271

7 Claims. (Cl. 33—1)

This application is a continuation-in-part of applicant's prior application, Serial No. 119,377, filed October 3, 1949, which is now abandoned.

The invention is a new approach to, and aids in, the solving of problems in angle arithmetic (division and multiplication of known and/or unknown angles) (according to the description on page 21 and shown in Fig. 46 of my book, referred to herein) and is in particular the means of utilizing a family of chordal curves, which are physical parallels to the result of certain equations that are based on Euclidian geometry.

This invention is based on the discovery of the law which is the basis for a system of angle arithmetic, viz:

$$R = \frac{r \sin na}{\sin a}$$

wherein "$n$" may be any number greater than zero. Methods for establishing the loci of each of this family of chordal curves is given in my book "Measuring with Chords, The Chordograph" copyrighted 1952. Each locus on such chordal curves may be determined by Euclidian construction, the equation in trigonometry being $$R = \frac{r \sin na}{\sin a}$$

in which "$na$" is a multiple of angle "$a$," "$n$" being a fractional, whole or mixed number, "$r$" is a constant angle, and "R" is the length of the curve radius which defines loci on a choral curve from a constant point (vertex of angle). This invention includes the use of a guide embodying this theory. The device utilized may take the form of a geometrical guide, similar to a protractor without degree marks having chordal curves. The guide may be formed with a plurality of curved grooves or slots for tracing of the loci. Likewise the guide may be formed with a plurality of external curved surfaces similar to a cam. Although the preferred embodiment of this invention includes a geometrical guide, a further embodiment may include any cam laid out to conform to a particular curve or a particular curve superimposed as a cam according to this invention.

Figure 4:
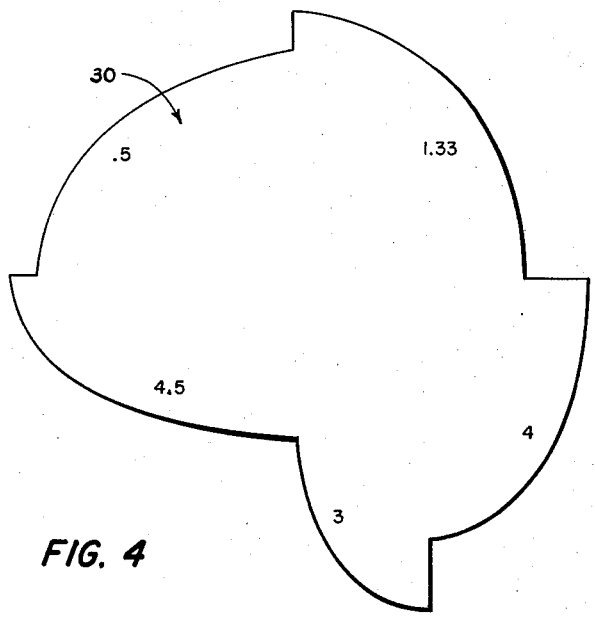
Figure 5:
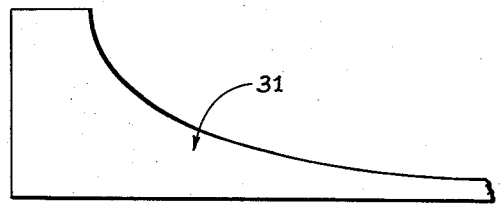
Figure 6:
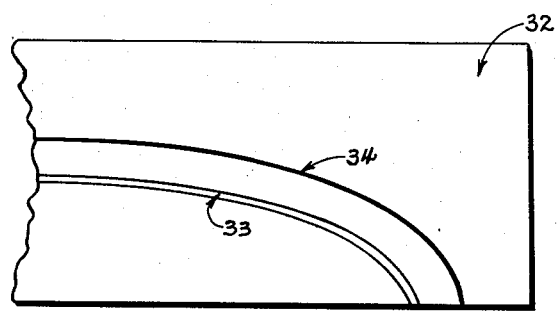

In this invention the devices such as the geometrical guide provide an instrument to practice the arithmetic of angles (multiplication, and division in all known and/or unknown angles) based on the system described herein. With this system we may divide and multiply, known and/or unknown angles mechanically and by computation. This system further simplifies all triangulation by using chords. Each locus on each chordal curve has a definite relation to all other loci of all such curves, such inter-relation being utilized to create this system of angle arithmetic. The system of angle arithmetic described herein and the device to be utilized therewith should be apparent by reference to the accompanying detailed description and the drawings in which Fig. 1 illustrates some of the curves in the shape of guides, Fig. 2 illustrates the use of the chordal curves to render angle division and multiplication, Fig. 3 illustrates a template or guide provided with a plurality of curved slots illustrating the division of fractional numbers, Fig. 4 illustrates a guide embodying certain chordal curves, Fig. 5 illustrates a guide with a single chordal curve, and Fig. 6 illustrates a guide for a cutting tool incorporating one of the chordal curves.

Referring first to the theory and namely the formula involved, each point on the illustrated curve may be determined by Euclidian construction, referring to Fig. 1, the equation in trigonometry being $$R = \frac{r \sin na}{\sin a}$$

in which "$na$" is a multiple of $\angle a$, "$n$" being any number, whole, fractional or mixed, indicating the dividing factor, "$r$" is a constant and equal to the radius of the curve for a dividing factor of one. "R" is the length of the curve radius which defines loci on a chordal curve from a constant point, said constant point being the vertex of a central angle indicated by the intersection of two center lines perpendicular to each other ($x$ and $y$ axis).

In geometry the equation is $$R = r\sqrt{x^2 + y^2}$$

giving the same result.

In the latter case "$x$" may be plurality of cosines, depending on the number "$n$" (being any fractional, whole or mixed number). It may be shown that, for the given value of $n$, $x$ is equal to the specified values, which, if 3, call for 2 cos $\angle a + \cos \angle 3a$; if 4, calls for $1 + 2$ cos $\angle 2a + \cos \angle 4a$; if 5, it calls for 2 cos $\angle a + 2$ cos $\angle 3a + \cos \angle 5a$ (note it may be shown just what the value of $x$ is for the various dividing factors). "$y$" is the sine of $\angle na$ (reference may be made to page 13 of my book referred to herein).

In both cases a line parallel to one side of angle $na$ at a distance therefrom equal to $r \sin na$ intersects a line drawn from the vertex of angle $na$ at an angle $a$ from the same one sided point P on the curve represented by the equation $$R = \frac{r \sin na}{\sin a}$$

Thus, the greatest value of "$x$" is "$nr$", when $\angle a$ (Figure 1) is equal to zero, "$n$" being a number and "$r$" being a constant.

Referring to Fig. 1 a perpendicular ($ry$) from the point of intersection of the curve radius and "lines ratio," intercepting "$x$," becomes "R cos $b$" of angle $b$, the apex angle opposite "$rx$." This shows that a conversion of "$r \sin na$" to "R cos $b$" has taken place.

"Lines ratio" is also instrumental in fixing the eccentricity of the chordal curve (Fig. 1), which is diverse for each "$n$."

Referring to Fig. 1 and specifically curve 3, if we assume that $\angle a = \frac{1}{3} \angle na$ and $\angle na = 45°$, then "R" would be $$\frac{r \sin .70710678}{\sin .25881905} \text{ or } 2.73205080 \, r$$

with a base of 2.63895674 $r$ and an altitude of .70710678 $r$; the base "$rx$" is made up of $2r$ cos $a + r$ cos $3a$, which in this case is .96592583 $rx$ $2 + .70710678 \, r$. Thus we can create chordal curves appearing as guides (slots, grooves, cams, profiles or contours) superimposed on or cut into a suitable material such as metal, plastic, film or glass, etc. When the curves have been superimposed on or cut into, film or glass, they may be used with a projection camera to be projected as desired (page 23 of my book).

Thus the equation for creating the chordal curves is written $$R = \frac{r \sin na}{\sin a}$$

The result of this equation is a series of unique curves, referring to Figs. 1 and 2 which when "$n$" is the numeral 1 or 2, is a semi-circle, when "$n$" is the numeral 3, it closely approaches an elliptic curve. The circle and semicircle are not claimed except as to their use in this system.

In the process of creating the chordal curves, we find that these curves bear a certain relationship to a central angle and its subtending arc. A physical angle layout may be used in the identification, transfer or demarcation of these points to accomplish division and multiplication of angles in practice.

In the arithmetic of angles any physical angle layout may be provided with a circular arc by using a tool of demarcation such as a pencil, scriber, etc., making sure that the horizontal center line ($x$ axis) of the implement is aligned in direction with one side of the angle to be manipulated and that the vertex of the angle is identical with the radial center of the $x$ and $y$ axis of the implement, or that $nr$ of the curve is identical with $nr$ of the layout. Thus a partial demarcation or transfer may be made of the particular curve or curves desired and after removing the instrument or angle layout, the intersection of this demarcation or transfer may be made by a parallel (lines of ratio) to one side of the angle through the point of intersection of the arc of unit radius, see Fig. 2, and the radial of angle $na$ ($abc$), and the radials of lesser angles ($ebs$, $hbc$) yields a point or points of dissection. These points are as accurate as skill and tools will permit. Supplementing this by drawing "$R$" (Fig. 1) and other lines of ratio as required, yields the solution to a problem of angle arithmetic.

The curves are super-imposed on some material (the material depending on the purpose the curves are to serve).

A. In drafting they may be cut in paper, cardboard, vellum, plastic or metal as a geometrical guide.

B. As a mechanical part, the curve may be on a cam, flat or tubular stock, and may be useful in electro-mechanical devices (note one of the chordal curves has been selected and is used in Fig. 5).

C. On film or glass the curve may be used for projection, reduction, enlargement, or scanning (instead of holes). (See page 23 on the book included by reference.)

Fig. 1 shows some of the curves, based on above principles of construction, the embodiment of all such curves in the shape of guides is sought to be protected by letters patent. In Fig. 2 the use of the chordal curves to render angle division, and multiplication is shown.

Let us assume that the problem is to reduce the angle "$jbc$" (Fig. 2), value not known, by one-fourth and increase it by one-half. We line up the angle so its vertex coincides with the intersection of the $x$ and $y$ axis and one leg of the angle aligns with the center line of the guides. We next draw arc "$fc$," we draw a sufficiently large portion of curves 4 and 6 to cover the range of "$k$" and "$g$" and remove the guide. Then a line drawn parallel (lines of ratio) to the base line of the angle from the intersection of curve 1 at "$j$" will intersect curve 4 and produce "$k$," a straight line from the vertex "$b$" through "$k$" intersects curve 6 and produces "$g$," and a line drawn parallel (line of ratio) to the base line of the angle from "$g$" intersects 1 to produce "$f$." Thus "$kbc$" = ¼ $jbc$, "$fbj$" = ½ $jbc$ and "$fbg$" = 1¼ $jbc$.

It must be apparent from the foregoing that a parallel (line of ratio) drawn to the line "$bc$" from the point of intersection of any of the curves by "$bg$" to arc "$ac$" of curve 1 renders a multiple of the angle of "$gbc$," this multiple being the number of the curve of origin. Auxiliary curves not included in Figs. 1–3 may be utilized to render additional arithmetic of angles, since they may be placed into relative position by their $nr$ (maximum $rx$) which is known.

It is to be noted that "$n$" may be any number over zero, each number being represented on the template 10 by a chordal curve that is diverse in shape and spaced at a different distance from the central angle vertex, and "$r$" may also be of any diverse value. The phrase "chordal curve" is used for lack of a more descriptive word.

The equations that are new and are applicable to this invention are $$R = \frac{r \sin na}{\sin a} \text{ and } R = r\sqrt{x^2 - y^2}$$

wherein "$x$" is the sum of a plurality of cosines and "$y$" is the sine of a central angle.

In Fig. 2 it may be shown that $\angle ebc = \frac{1}{2} \angle abc$, $\angle hbc = \frac{1}{3} \angle abc$, $\angle ebh = \frac{1}{6} \angle abc$, $\angle kbc = \frac{1}{4} \angle hbc = \frac{1}{12} \angle abc$; also that $\angle kbc$ multiplied by 6 equals $\angle ebc$.

Referring to the drawings, Fig. 2 illustrates the chordal curves from 1 to 6 while Fig. 1 illustrates a method of plotting the plurality of loci to obtain each point on each chordal curve by means of the lines of ratio. The whole number chordal curves 1 through 6 appear as separate slots cut in a single sheet of material that is to be utilized as a geometrical instrument. Referring to Fig. 3 there is provided a template 10 in which a plurality of slots 11–15 inclusive are illustrated. The intersection of the $x$ and $y$ axis of the instrument provides a point of origin (vertex of angle) for each curve radius of the chordal curves shown. Slot 11 provides the chordal curve for the fraction ⅓ on its surfaces 16 while the chordal curve for the fraction ½ is provided on the opposite surface 17. Slot 12 provides the chordal curve for the fraction ⅔ on its surface 18 while the semicircle or chordal curve for one or 3/3 is provided on the surface 19. Slot 13 provides the chordal curve for a fraction ⅘ on its surface 20 while it provides the chordal curve for the fraction ⅗ on its surface 21. Slot 14 provides the chordal curve for the fraction 9/8 on its surface 22, while it provides the chordal curve for the fraction ⅞ on its surface 23. Slot 15 provides the chordal curve for the fraction 8/3 on its surface 24 while it provides the chordal curve for the fraction 9/3 on its surface 25.

Referring to Fig. 4 there is provided a template 30 with a plurality of chordal curves laid out around the periphery of the template. This template may be constructed with the curves as shown on the template 10 of Fig. 3 so that in effect it produces the identical curves found in template 10 or this template may provide additional chordal curves not included in template 10. It is apparent that each chordal curve used in the template 30 of Fig. 4 must be provided with a base line (as shown in template 10 of Fig. 3) and in addition identification numbers must be marked adjacent to each chordal curve. The particular arrangement of these curves (slots or grooves) has no meaning except to show that the numerical sequence and its relation to the point of origin (as shown in Fig. 3) need not be followed, since these curves may be spotted on a layout by their "$nr$" and base line. Also, such auxiliary curves, single or grouped, afford economy in stock. Again, such single (or grouped) curves may be spotted by their $x$ and $y$ axis. This template may function as a cam in a lathe, four-slide machines, screw-machines, routing machines, etc. This template may be mounted stationary in relation to the machine, or by means of a rotatable center to rotate with respect to the machine. The particular chordal curves selected may vary according to the use of the template. However in this instance the template 30 includes the chordal curves for the mixed number 1.33, the whole number 4, the whole number 3, the mixed number 4.5 and the fraction ½ or .5. The particular numbered curves chosen have no significance except to select the templates to draw them. Referring to Fig. 5 there is illustrated a further template 31 which may take any desired form (such as a circle) according to its intended use but as illustrated in this embodiment it includes a single chordal curve (in this instance it represents the curves starting at the cotangent of 14° 20 min. as an example) which may be the particular one necessary in the solution of the problem at hand. As such curves can be reproduced on tubular stock, the curve may cover 180° or 360° in a further embodiment, a rotary motion about the axis of the tubular stock or a straight forward motion providing "lines ratio" and "R" when the produced curve is in use. This may provide the non-linear curve required in microwave frequency meter resonators. Fig. 5 also represents a template for use with a profiling attachment. Referring to Fig. 6 we have illustrated a further embodiment of this invention in the form of a template or guide 32. In this instance a particular chordal curve 33 (which may be similar to curve 7 of Fig. 1) is to be produced. To produce the curve (7 of Fig. 1) it must be formed as an open slot while a parallel groove 34 is formed at a predetermined distance from the curve 33. To create this parallel groove the curve in this instance starts at the cotangent of 12° 51 min. as an example (approximate). The reason for this construction is that such slot or groove must provide a guide path for a profiling attachment, the cutting point of which will produce curve 33 while the tracer travels in the groove or slot 34. For routing curve 33 should be formed as a slot to guide the router bit. For milling, curve 33 should be formed as a clearance slot to admit the cutting tool and groove 34 is then used as a guide for the tool. To utilize the template 32 with a cutting tool, the cutting tool is provided with a guide pin (not shown) and the guide pin is used to follow the groove 34 so that the cutting tool will follow the slot surrounding the chordal curve 33 and will not be guided by the slot. The slot 33 is only provided for the cutting tool to pass therethrough. This slot must be cut to make allowance for the space required for the end of the device that must pass therethrough for the milling or routing operation. This type of template is most effective for a milling or routing operation.

Various changes or modifications may be made to the devices illustrated herein without departing from the spirit of this invention and this invention shall be limited only by the formula described herein and by the appended claims.

What is claimed is:

1. A geometrical instrument, of suitable shape and material, embodying spaced slots in the shape of curves, which are guides for devices for transfer or demarcation, said slots being parallel to loci which are determined by the formula $$R = \frac{r(\sin na)}{\sin a}$$

wherein "R" is the length of the radius which defines loci on a chordal curve from a constant point, said constant point being the vertex of a central angle indicated by the intersection of two centerlines perpendicular to each other, wherein "a" is the acute angle between a straight line through said constant point and the radius, said loci being on lines of ratio which parallel said straight line at a distance r (sin na) from said straight line, wherein "n" is the dividing factor and has values equal to successive fractional, whole or mixed numbers for successive loci curves, wherein "r" is a constant, and the loci on lines of ratio determine the eccentricity of the chordal curve.

2. In a device according to claim 1 in which the loci form a chordal curve for each dividing factor, each curve being identified by a different fractional, whole or mixed number, the number indicating the dividing factor "n."

3. In a device according to claim 1 which includes spaced slots in the shape of curves for dividing angles of 180° or less into a plurality of parts by means lines of ratio and "R."

4. A geometrical instrument, of suitable shape and material embodying spaced slots in the shape of curves, each slot formed by the contour of two separate curves, each on an opposite face of said slot, said slots being guides for tools of transfer or demarcation, said curved faces of said slots being parallel to loci which are determined by the formula $$R = \frac{r(\sin na)}{\sin a}$$

wherein "R" is the length of the radius which defines loci on a chordal curve from a constant point, said constant point being the vertex of a central angle indicated by the intersection of two centerlines perpendicular to each other, wherein "a" is the acute angle between a straight line through said constant point and the radius, said loci being on lines of ratio which parallel said straight line at a distance r (sin na) from said straight line, wherein "n" is the dividing factor and has values equal to successive fractional, whole or mixed numbers for successive loci curves, wherein "r" is a constant, and the loci on lines of ratio determine the eccentricity of the chordal curve.

5. A geometrical instrument, of suitable shape and material, embodying surfaces in the shape of curves, which are guides for tools of transfer or demarcation, said surfaces being parallel to loci which are determined by the formula $$R = \frac{r(\sin na)}{\sin a}$$

wherein "R" is the length of the radius which defines loci on a chordal curve from a given point, said given point being the same point at reference to all curves, wherein "a" is the acute angle between a straight line through said given point and the radius, said loci for each surface being on lines of ratio which parallel said straight line at a distance r (sin na) from said straight line, wherein "n" is the dividing factor and has values equal to successive fractional, whole or mixed numbers for successive loci curves, wherein "r" is a constant, and the loci on lines of ratio determine the eccentricity of the chordal curve.

6. In a device according to claim 5 in which the loci form a chordal curve for each dividing factor, each curve being identified by a different fractional, whole or mixed number, the number indicating the dividing factor "n."

7. In a device according to claim 5 which includes spaced surfaces each with a given factor in the shape of curves for dividing angles of 180° or less into a plurality of parts by means lines of ratio and "R."

References Cited in the file of this patent

UNITED STATES PATENTS

| D. 60,493 | Henley | Feb. 28, 1922 |
| D. 137,150 | Riddell | Jan. 25, 1944 |
| D. 147,526 | Brown | Sept. 23, 1947 |
| 381,049 | Yanez | Apr. 10, 1888 |
| 2,478,071 | Agrillo | Aug. 2, 1949 |
| 2,487,673 | Roper | Nov. 8, 1949 |

FOREIGN PATENTS

| 812,374 | Germany | Aug. 30, 1951 |

OTHER REFERENCES

Yates: "The Trisection Problem," published by The Franklin Press, Inc., Baton Rouge, La. 1942, pages 29–30.